(12) United States Patent
Alp et al.

(10) Patent No.: US 8,007,946 B2
(45) Date of Patent: Aug. 30, 2011

(54) FUEL CELL SYSTEM WARM-UP STRATEGY WITH REDUCED EFFICIENCY LOSSES

(75) Inventors: Abdullah B. Alp, West Henrietta, NY (US); Steven D. Burch, Honeoye Falls, NY (US); Marc Becker, Idstein (DE)

(73) Assignee: GM Global Technology Operations LLC, Detroit, MI (US)

( * ) Notice: Subject to any disclaimer, the term of this patent is extended or adjusted under 35 U.S.C. 154(b) by 1009 days.

(21) Appl. No.: 11/860,118

(22) Filed: Sep. 24, 2007

(65) Prior Publication Data

US 2009/0081505 A1    Mar. 26, 2009

(51) Int. Cl.
*H01M 8/04* (2006.01)
(52) U.S. Cl. .......... 429/429; 429/433; 429/442
(58) Field of Classification Search .......... None
See application file for complete search history.

(56) References Cited

FOREIGN PATENT DOCUMENTS

JP    2006-114336    *    4/2006

* cited by examiner

*Primary Examiner* — Jonathan Crepeau
(74) *Attorney, Agent, or Firm* — John A. Miller; Miller IP Group, PLC

(57) ABSTRACT

A method for quickly and efficiently heating a fuel cell stack at system start-up. The method uses and prioritizes various stack heat sources based on their efficiency to heat the stack. A thermal set-point for heating the stack to the desired temperature is determined based on the ambient temperature and, the stack cooling fluid temperature. The set-point is then compared-to the stack heating provided by the heat sources that are operating through normal system start-up operation. If more heat is necessary to reach the set-point, the method may first charge a system battery using stack power where the load causes the fuel cell stack to heat up. If additional heating is still required, the method may then turn on a cooling fluid heater, then flow a small amount of hydrogen into the cathode inlet stream to provide combustion, and then increase the compressor load as needed.

19 Claims, 2 Drawing Sheets

US 8,007,946 B2

FUEL CELL SYSTEM WARM-UP STRATEGY WITH REDUCED EFFICIENCY LOSSES

BACKGROUND OF THE INVENTION

1. Field of the Invention

This invention relates generally to a method for quickly and efficiently heating a fuel cell stack at system start-up and, more particularly, to a method for heating a fuel cell stack at system start-up that prioritizes and uses heat sources based on their efficiency.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

A fuel cell stack typically includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

A fuel cell stack operates more efficiently and more stably at a certain stack operating temperature that is typically controlled by a cooling fluid flowing through the stack. At system start-up, the fuel cell stack will typically be at a low temperature, possibly below freezing. It is desirable to heat the stack as quickly as possible to the desired temperature at system start-up so that the stack will operate more efficiently and more stably sooner.

SUMMARY OF THE INVENTION

In accordance with the teachings of the present invention, a method is disclosed for quickly and efficiently heating a fuel cell stack at system start-up. The method uses and prioritizes various stack heat sources based on their efficiency to heat the stack. A thermal power set-point for heating the stack to the desired temperature is determined based on the ambient temperature and the stack cooling fluid temperature. The set-point is then compared to the stack heating provided by the heat sources that are operating through normal system start-up operation. If more heat is necessary to reach the set-point, the method may first charge a system battery using stack power where the load causes the fuel cell stack to heat up. If additional heating is still required, the method may then turn on a cooling fluid heater, then flow a small amount of hydrogen into the cathode inlet stream to provide combustion, and then increase the compressor load as needed.

Additional features of the present invention will become apparent from the following description and appended claims taken in conjunction with the accompanying drawings.

DETAILED DESCRIPTION OF THE EMBODIMENTS

The following discussion of the embodiments of the invention directed to a method for prioritizing and using various heat sources for heating a fuel cell stack at system start-up based on their efficiency is merely exemplary in nature, and is in no way intended to limit the invention or its applications or uses.

As will be discussed in detail below, the present invention proposes a method for heating a fuel cell stack at system start-up as quickly and efficiently as possible that minimizes stack warm-up time. The method employs several different heat sources to be used to heat the stack at system start-up. Those heat sources include heat generated by stack inefficiencies based on stack load, a cooling fluid heater, end-cell heaters in the stack, flowing hydrogen into the cathode side of the stack to create catalytic combustion and over-loading the cathode compressor to generate heat in the cathode air cell. Stack heat generation can be increased by charging a high voltage battery, which acts as a stack load. Because the energy used to charge the battery is recoverable from the battery, this technique of heating the stack is the most efficient. Using the cooling fluid heater and the stack end-cell heater not only heat the cooling fluid and the stack end cells, but also increases stack load current, which also operates to heat the stack. Because of this double heating effect, the cooling fluid heaters and the end cell heaters are the second most efficient way of heating the fuel cell stack. The next most efficient way of heating the fuel cell stack is to inject a small amount of hydrogen into the cathode side of the stack where it will combust, generating heat. There are component limitations on how much hydrogen can be injected into the cathode side of the stack. Also, some of the injected hydrogen may flow to the exhaust causing undesirable emission spikes in the system. The last technique for generating extra heat for heating the stack is by increasing the pressure ratio across the compressor to heat the cathode inlet air and increase the electric load on the stack. This method is typically inefficient and creates extra noise in the system.

Figure 1:
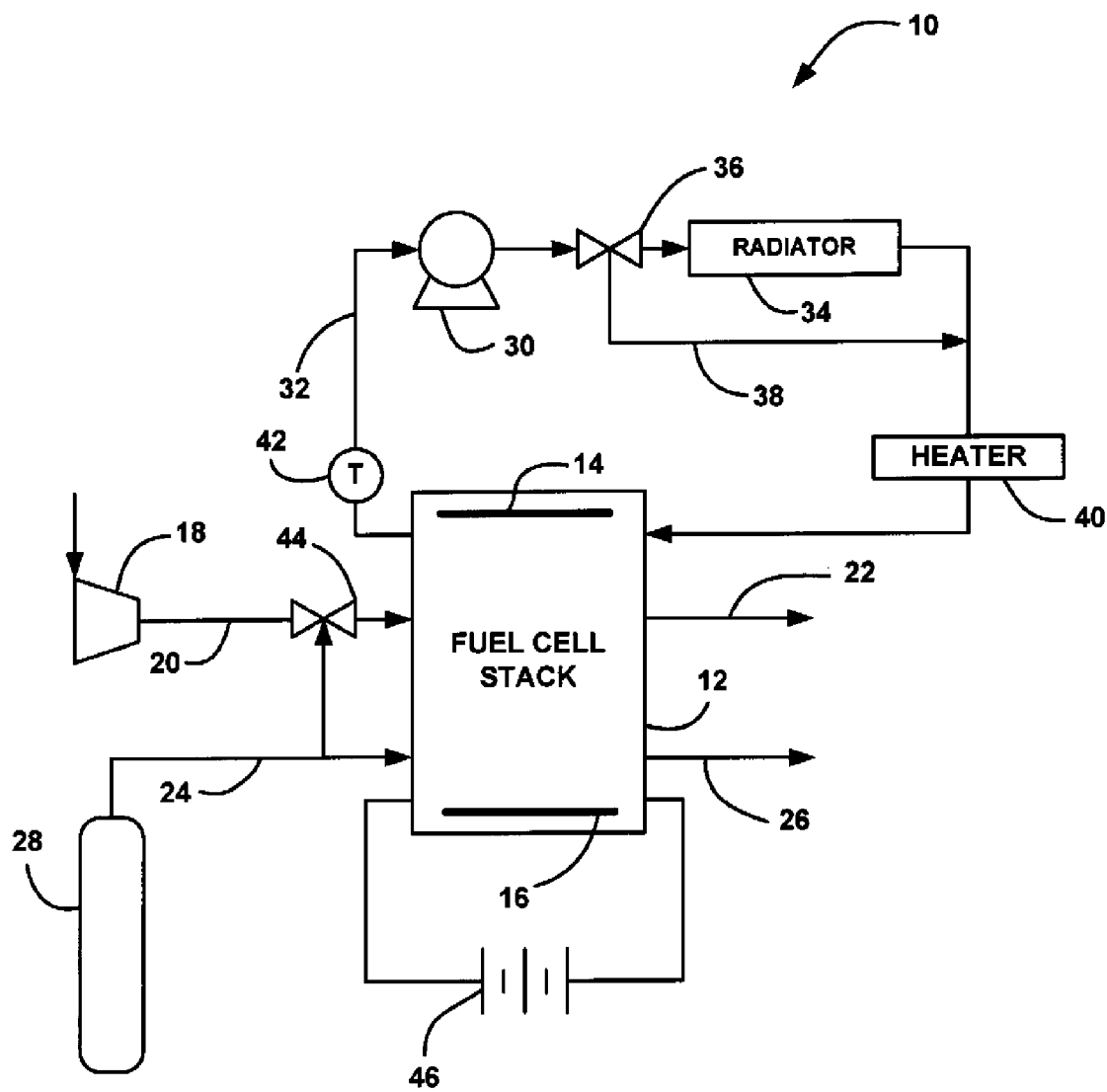
FIG. 1 is a block diagram of a fuel cell system.

FIG. 1 is a plan view of a fuel cell system 10 including a fuel cell stack 12. The fuel cell stack 12 includes end cell heaters 14 and 16 provided in the end cells of the stack 12. The fuel cell stack 12 receives cathode input air from a compressor 18 on cathode input line 20, and outputs cathode exhaust gas on cathode output line 22. Likewise, the fuel cell stack 12 receives hydrogen gas on anode input line 24 from a hydrogen storage source 28, and outputs anode exhaust gas on anode output line 26. Hydrogen gas from the source 28 can be selectively provided to the cathode input line 20 and into the cathode side of the stack 12 through a valve 44 to provide combustion on the cathode side of the stack 12 to heat the stack 12 in a manner that is well understood to those skilled in the art.

Cooling fluid flow channels are provided in the bipolar plates in the fuel cell stack 12. A cooling fluid is pumped through the cooling fluid flow channels by a pump 30 and through a cooling fluid loop 32 outside of the stack 12. The cooling fluid in the loop 32 from the stack 12 is sent to a radiator 34 where it is reduced in temperature prior to being sent back to the fuel cell stack 12. A by-pass valve 36 in the loop 32 can be controlled to allow a selective amount of the cooling fluid to by-pass the radiator 34 on a by-pass line 38 so that the cooling fluid is not cooled by the radiator 34. A cooling fluid heater 40 in the cooling fluid loop 32 can be used to heat the cooling fluid at stack start-up. A temperature sensor 42 measures the temperature of the cooling fluid in the loop 32 coming out of the stack 12.

The system 10 also includes a high voltage battery 46 that is electrically coupled to the fuel cell stack 12, and can be charged by the stack 12.

According to the invention, a stack warm-up algorithm heats the stack 12 at system start-up so that the stack 12 reaches its desirable operating temperature more quickly and in an efficient manner. The algorithm first determines how much heat is being generated by the various heat sources that heat the stack 12 from the normal operation of the system 10. For example, if large loads are placed on the stack 12 immediately at system start-up, then the heat generated by the stack 12 itself should be sufficient to heat the stack 12 to its operating temperature quickly. If enough heat is not being generated from normal system operation because the stack 12 is too cold or the heat sources are not sufficient, the algorithm activates and prioritizes the various heat sources based on efficiency and amount of heat desired. This prioritizing includes first drawing current from the stack 12 to charge the battery 46. If the stack 12 cannot generate enough heat by charging the battery 46 to heat the stack 12 quickly enough, then the algorithm will turn on the cooling fluid heater 40. If more heat is still needed, then the algorithm will feed hydrogen into the cathode side of the stack 12 through the valve 44 to create combustion. If more heat is still needed, then the pressure ratio across the compressor 18 can be increased by, for example, closing a valve in the line 20 that causes the compressor 18 to work harder.

According to the invention, the set-point for the warm-up algorithm is based on the cooling fluid outlet temperature from the temperature sensor 42 and the ambient temperature, which are used to identify a thermal power in kilowatts that identifies how much heat is to be provided. Based on equation (1) below, the gross heat generation $\dot{Q}_{gross}$ is calculated by adding stack heat generation $\dot{Q}_{stack}$, cooling fluid heater heat generation $\dot{Q}_{coolant\ heater}$, end cell heater heat generation $\dot{Q}_{end}$ $_{cell\ heater}$, heat generated by the cathode hydrogen flow $\dot{Q}_{H_2}$ and compressor heat generation $\dot{Q}_{compressor}$.

$$\dot{Q}_{gross} = \dot{Q}_{stack} + \dot{Q}_{coolant\ heater} + \dot{Q}_{end\ cell\ heater} + \dot{Q}_{H_2} + \dot{Q}_{compressor} \quad (1)$$

Stack heat generation can be calculated as:

$$\dot{Q}_{stack} = \dot{P}_{gross} * \left( \frac{1.25}{V_{avg\ cell}} - 1 \right) \quad (2)$$

Compressor heat into the cooling fluid may be neglected because it is generally small in magnitude relative to the other heat sources and difficult to measure accurately. The effect of extra compressor power on stack load and stack generated heat is accounted for in equation (2).

$$\dot{Q}_{H_2} = \dot{m}_{H_2} * LHV_{H_2} * r_{slip} \quad (3)$$

Where the lower heating value for hydrogen is 120 kW/(g/sec) and $r_{slip}$ is a function of cooling fluid outlet temperature and average cell voltage.

Figure 2:
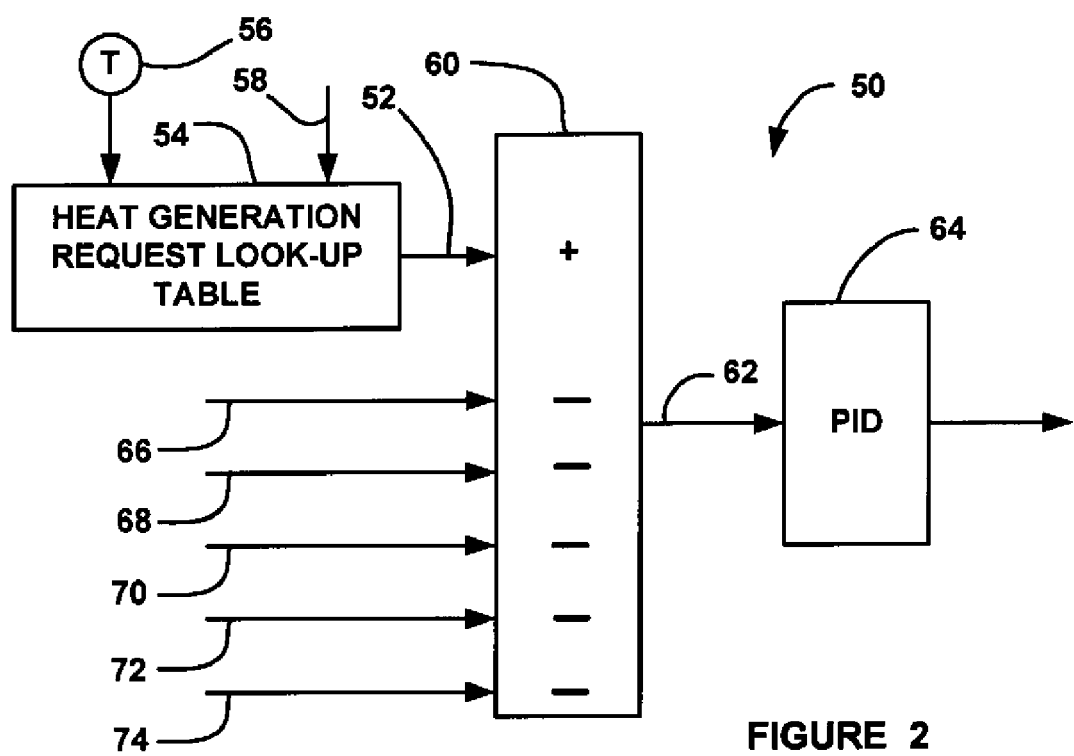
FIG. 2 is a block diagram of a controller showing a process for quickly and efficiently heating a fuel cell stack at system start-up, according to an embodiment of the present invention.

FIG. 2 is a block diagram 50 showing a process for determining the heat required for heating the stack 12 to the desired temperature within a short period of time at system start-up, according to an embodiment of the present invention. A heat generation request signal is provided on line 52 from a look-up table 54 depending on the ambient temperature from an ambient temperature sensor 56 and the cooling fluid temperature on line 58 from the temperature sensor 42. The heat generation request signal is sent to a summation block 60 that determines a heat generation error on line 62 as the difference between the heat that is currently being provided to the stack 12 by normal system heat sources and the desired heating of the stack 12. The error is provided to a proportional-integral-differential (PID) controller 64 that generates a heat delta request that the warm-up algorithm will then use to prioritize additional heating of the stack 12 based on the discussion above.

If the system 10 is started, and the vehicle operator immediately operates the vehicle, the load on the stack 12 will provide stack heat generation on line 66 based on equation (2). This stack heat generation may be sufficient to meet the demands of heating the stack 12 quickly and efficiently. The stack 12 may be providing power to operate the compressor 18, the cooling fluid pump 30, etc., which also adds to the amount of heat provided on the line 66 based on equation (2). The end cell heaters 14 and 16 may be on as controlled by an end cell heating algorithm, which will provide additional heat generation on line 68 that will reduce the error from the summation block 60.

If the heat generated by the various heat sources at system start-up is not great enough to reduce the error to zero, then the warm-up algorithm may provide additional heat that is prioritized based on source sufficiency. The algorithm will first provide a battery charging request from the stack 12 that adds to the stack heat generation on the line 66. Next, the algorithm will turn on the cooling fluid heater 40 to provide stack heating on line 70. The algorithm can also add heat to the stack 12 by providing hydrogen to the cathode side of the stack 12 that provides heat on line 72. Further, the algorithm can then close a compressor valve to provide more compressor load on line 74. By selectively controlling the various heat sources to provide enough heat to meet the heat request based on the ambient temperature and the cooling fluid outlet temperature, the algorithm can more efficiently heat the stack 12 at system start-up as quickly as possible.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for heating a fuel cell stack in a fuel cell system, said method comprising:
    determining a heat set-point for heating the stack to a desired temperature;
    determining whether current heat sources will heat the stack to the desired temperature; and
    using and prioritizing additional stack heating from the heat sources based on a heating efficiency of the sources.

2. The method according to claim 1 wherein determining the heat set-point includes determining the heat set-point using a look-up table based on ambient temperature and a temperature of a cooling fluid flowing through the stack.

3. The method according to claim 1 wherein determining whether current heat sources will heat the stack to the desired temperature includes combining stack heat generation, stack end cell heater heat generation, cooling fluid heater heat generation, amount of hydrogen being input into the cathode side of the stack and compressor heat generation.

4. The method according to claim 1 wherein prioritizing the heat sources includes first using the stack to charge a high voltage battery as a load on the stack.

5. The method according to claim 4 wherein prioritizing the heat sources includes turning on a cooing fluid heater.

6. The method according to claim 5 wherein prioritizing the heat sources includes inputting hydrogen into a cathode side of the fuel cell stack.

7. The method according to claim 6 wherein prioritizing the heat sources includes increasing a compressor pressure ratio for a compressor that provides cathode air to the stack.

8. The method according to claim 1 wherein determining whether current heat sources will heat the stack to the desired temperature includes determining an error signal as the difference between a desired stack heating and a current stack heating.

9. The method according to claim 8 wherein the error signal is sent to a proportional-integral-differential controller to generate a heat request signal.

10. A method for heating a fuel cell stack in a fuel cell system at system start-up, said method comprising:
    determining a heat set-point for heating the stack to a desired temperature where the heat set-point is based on ambient temperature and a stack cooling fluid temperature;
    determining whether current heat sources will heat the stack to the desired temperature;
    determining an error signal as the difference between the heat set-point and current stack heating; and
    providing additional stack heating if the error signal indicates that the current stack heating is not enough to heat the stack to the heat set-point.

11. The method according to claim 10 wherein providing additional stack heating includes prioritizing the heat sources by heating efficiency.

12. The method according to claim 11 wherein prioritizing the heat sources includes first using the stack to charge a high voltage battery as a load on the stack.

13. The method according to claim 12 wherein prioritizing the heat sources includes then turning on a cooing fluid heater.

14. The method according to claim 13 wherein prioritizing the heat sources includes then inputting hydrogen into a cathode side of the fuel cell stack.

15. The method according to claim 14 wherein prioritizing the heat sources includes then increasing a compressor pressure ratio.

16. A method for heating a fuel cell stack in a fuel cell system at system start-up, said method comprising:
    determining how much heat is required to heat the stack to a desired temperature;
    prioritizing a plurality of heat sources that can heat the stack based on heating efficiency; and
    using the heat sources in an order based on their prioritization to heat the stack to the desired temperature.

17. The method according to claim 16 wherein determining how much heat is required includes determining how much heat is required based on ambient temperature and a temperature of a cooling fluid flowing through the stack.

18. The method according to claim 16 wherein prioritizing the heat sources includes prioritizing using the stack to charge a high voltage battery, turning on a cooling fluid heater, inputting hydrogen into a cathode side of the fuel cell stack and increasing a compressor pressure ratio for a compressor that provides cathode air to the stack.

19. The method according to claim 18 wherein prioritizing the heat sources includes first charging the high voltage battery, then turning on the cooling fluid heater, then inputting hydrogen into a cathode side of the fuel cell stack and then increasing the compressor pressure ratio.

* * * * *